(12) United States Patent
Asgekar et al.

(10) Patent No.: US 10,650,071 B2
(45) Date of Patent: May 12, 2020

(54) SEARCH AND RETRIEVAL OF KEYED DATA MAINTAINED USING A KEYED DATABASE

(71) Applicant: Google LLC, Mountain View, CA (US)

(72) Inventors: Amogh S. Asgekar, Mountain View, CA (US); Piyush Prahladka, Sunnyvale, CA (US); Kumara Tharmalingam, Los Gatos, CA (US)

(73) Assignee: Google LLC, Mountain View, CA (US)

( * ) Notice: Subject to any disclaimer, the term of this patent is extended or adjusted under 35 U.S.C. 154(b) by 514 days.

(21) Appl. No.: 15/378,135

(22) Filed: Dec. 14, 2016

(65) Prior Publication Data

US 2018/0150565 A1    May 31, 2018

Related U.S. Application Data

(60) Provisional application No. 62/426,907, filed on Nov. 28, 2016.

(51) Int. Cl.
*G06F 16/00* (2019.01)
*G06F 16/955* (2019.01)
(Continued)

(52) U.S. Cl.
CPC ............ *G06F 16/955* (2019.01); *G06F 16/29* (2019.01); *G06F 16/951* (2019.01); *G06F 16/9537* (2019.01); *G06N 20/00* (2019.01)

(58) Field of Classification Search
CPC .. G06F 16/955; G06F 16/9537; G06F 16/951; G06F 16/29; G06N 20/00
See application file for complete search history.

(56) References Cited

U.S. PATENT DOCUMENTS 7,630,828 B2    12/2009 Tajima et al.
8,069,169 B2 *  11/2011 Fitzpatrick ....... G06Q 10/06311
                                           707/732

(Continued)

FOREIGN PATENT DOCUMENTS

WO    WO2013181434    12/2013
WO    WO 2013192591   12/2013

OTHER PUBLICATIONS

International Search Report and Written Opinion issued in International Application No. PCT2016/066958, dated Jun. 7, 2017, 15 pages.

*Primary Examiner* — Jared M Bibbee
(74) *Attorney, Agent, or Firm* — Fish & Richardson P.C.

(57) ABSTRACT

A digital content acceleration system comprising: a keyed database for storing keyed data; a data retrieval engine that retrieves, in response to receiving an item of keyed data, one of i) search data indicative of a search history associated with the item of keyed data, ii) web history data indicative of one or more web pages accessed by a terminal device associated with the item of keyed data, or iii) both i) and ii); a parsing engine that extracts one or more attributes from the search data and the web history data; a terminal device network access engine that generates, based on the one or more attributes, a probability distribution for geographic locations; a content selection engine that retrieves, from a digital content provider, digital content associated with a particular geographic location of the geographic locations; and a digital content assembler engine that pre-assembles the digital content.

35 Claims, 9 Drawing Sheets

(51) Int. Cl.
*G06N 20/00* (2019.01)
*G06F 16/29* (2019.01)
*G06F 16/951* (2019.01)
*G06F 16/9537* (2019.01)

(56) References Cited

U.S. PATENT DOCUMENTS

| | | | | |
|---|---|---|---|---|
| 8,239,266 B1* | 8/2012 | Charaniya | | H04W 4/21 |
| | | | | 705/14.54 |
| 8,788,328 B1* | 7/2014 | George | | G06Q 90/00 |
| | | | | 705/14.1 |
| 9,084,082 B2* | 7/2015 | Barrand | | H04W 4/02 |
| 9,582,603 B1* | 2/2017 | Acharya | | H04L 67/1097 |
| 2002/0028681 A1* | 3/2002 | Lee | | H04W 4/029 |
| | | | | 455/456.3 |
| 2002/0087505 A1* | 7/2002 | Smith | | G06Q 10/087 |
| 2004/0073482 A1* | 4/2004 | Wiggins | | G06Q 30/02 |
| | | | | 705/14.5 |
| 2009/0164408 A1* | 6/2009 | Grigorik | | G06F 16/9535 |
| 2011/0191812 A1* | 8/2011 | Cory | | G06F 15/16 |
| | | | | 725/109 |
| 2013/0198328 A1* | 8/2013 | Green | | H04L 67/02 |
| | | | | 709/217 |
| 2014/0207912 A1* | 7/2014 | Thibeault | | H04L 65/4084 |
| | | | | 709/219 |
| 2014/0222570 A1* | 8/2014 | Devolites | | H04W 4/029 |
| | | | | 705/14.58 |
| 2014/0229279 A1* | 8/2014 | Hohs | | G06Q 30/0251 |
| | | | | 705/14.53 |
| 2014/0280121 A1* | 9/2014 | Sharp | | G06F 16/24578 |
| | | | | 707/732 |
| 2015/0134432 A1* | 5/2015 | Lewis | | G06Q 30/0261 |
| | | | | 705/14.13 |
| 2015/0339397 A1* | 11/2015 | Brush | | G01C 21/3484 |
| | | | | 701/423 |
| 2016/0018241 A1* | 1/2016 | Jung | | G01C 21/3679 |
| | | | | 701/420 |
| 2016/0119279 A1* | 4/2016 | Maslak | | H04L 61/1511 |
| | | | | 709/223 |
| 2016/0134711 A1* | 5/2016 | Croteau | | H04L 67/18 |
| | | | | 455/457 |
| 2016/0267496 A1* | 9/2016 | Zhang | | G06Q 30/0201 |
| 2017/0150321 A1* | 5/2017 | Ciecko | | H04W 4/029 |
| 2017/0155942 A1* | 6/2017 | Chen | | H04N 21/2668 |
| 2018/0268253 A1* | 9/2018 | Hoffman | | G06K 9/6215 |

* cited by examiner

SEARCH AND RETRIEVAL OF KEYED DATA MAINTAINED USING A KEYED DATABASE

CLAIM OF PRIORITY

This application claims priority under 35 USC § 119(e) to U.S. Patent Application Ser. No. 62/426,907, filed on Nov. 28, 2016, the entire contents of which are hereby incorporated by reference.

BACKGROUND

Computer systems use Global Positioning System (GPS) data to determine a geographic location of a device. A device can use the GPS data to deliver digital content that is relevant to the determined geographic location.

SUMMARY

This document describes a digital content acceleration system that includes a keyed database for storing keyed data; a data retrieval engine that retrieves, in response to receiving an item of keyed data, one of i) search data indicative of a search history associated with the item of keyed data, ii) web history data indicative of one or more web pages accessed by a terminal device associated with the item of keyed data, or iii) both i) and ii); a parsing engine that extracts one or more attributes from the search data and the web history data, the one or more attributes characterizing the search data and the web history data; a terminal device network access engine that generates, based on the one or more attributes, a probability distribution for geographic locations, a probability of the probability distribution being indicative of a likelihood that one or more terminal devices associated with the item of keyed data request digital content associated with a geographic location associated with that probability; a content selection engine that retrieves, from a digital content provider, digital content associated with a particular geographic location of the geographic locations, the particular geographic location associated with a greater probability relative to other probabilities associated with other geographic locations; and a digital content assembler engine that pre-assembles the digital content associated with the particular geographic location for sending to the terminal device associated with the item of keyed data, such that the digital content is assembled for rendering in advance of the system receiving in response to a request to provide the digital content for display on the from the terminal device for the digital content.

In some implementations, the keyed data includes a search history and/or a browsing history of a user of the terminal device. In some implementations, the system is configured to send the pre-assembled digital content to the terminal device during a period when the terminal device is online, and in advance of a request for the digital content being sent from the terminal device, such that the digital content is available to the user of the terminal device in the event that the user subsequently issues a request for the digital content during a period when the terminal device is offline.

In some implementations, generating the probability distribution includes clustering, into one or more topic clusters, the one or more attributes, the one or more topic clusters each indicative of a topic of a predetermined list of topics; transforming, using a trained model, the one or more topic clusters into location data indicative of one or more geographic locations associated with a user; and generating, based on the transforming, a probability that the user will visit each geographic location of the one or more geographic locations. In some implementations, the transforming comprises executing one more machine learning algorithms.

In some implementations, the parsing engine extracts demographic data associated with a user, and wherein the one or more attributes further characterize the demographic data.

In some implementations, the search data and the web history data are each associated with timing data, and the terminal device network access engine generates the distribution of probabilities based on the timing data.

In some implementations, the data retrieval engine fetches geographic location history data indicative of one or more geographic locations visited by a user, and the one or more attributes further characterize the geographic location history data.

In some implementations, the one or more attributes include one or more of keywords and key phrases. In some implementations, the parsing engine extracts the one or more attributes based on matrix factorization or low rank approximation. In some implementations, the digital content retrieved comprises a branded pin for placement on a virtual geographic map, the branded pin representing the particular geographic location associated with the digital content. In some implementations, the digital content comprises a content item for an entity located at the particular geographic location associated with the digital content.

The described system may provide for one or more benefits, such as reducing the latency for serving digital content that is caused by the retrieval of the digital content from a remote digital content provider in response to a request for the digital content. The digital content can be stored in a memory of the system or to a disk of the system. Storing the digital content in memory reduces the latency for serving the digital content in response to a request in real-time because the system serves the digital content without performing a data query and retrieval from a database. The digital content can be served along with other content, such as publisher content, and thus be indistinguishable from the publisher content to a terminal device. The described system serves digital content that is more relevant to a user. The described system uses keyed data to increase retrieval speed of cached data and associate cached data with user data without requiring a device identification of a client device. The described system presents the cached digital content along with other content of an application and reduces the presentation of blank spaces on a web page associated with the digital content.

The details of one or more embodiments are set forth in the accompanying drawings and the description below. Other features, objects, and advantages of the techniques described herein will be apparent from the description and drawings, and from the claims.

DESCRIPTION OF DRAWINGS

Like reference symbols in the various drawings indicate like elements.

DETAILED DESCRIPTION

Figure 1:
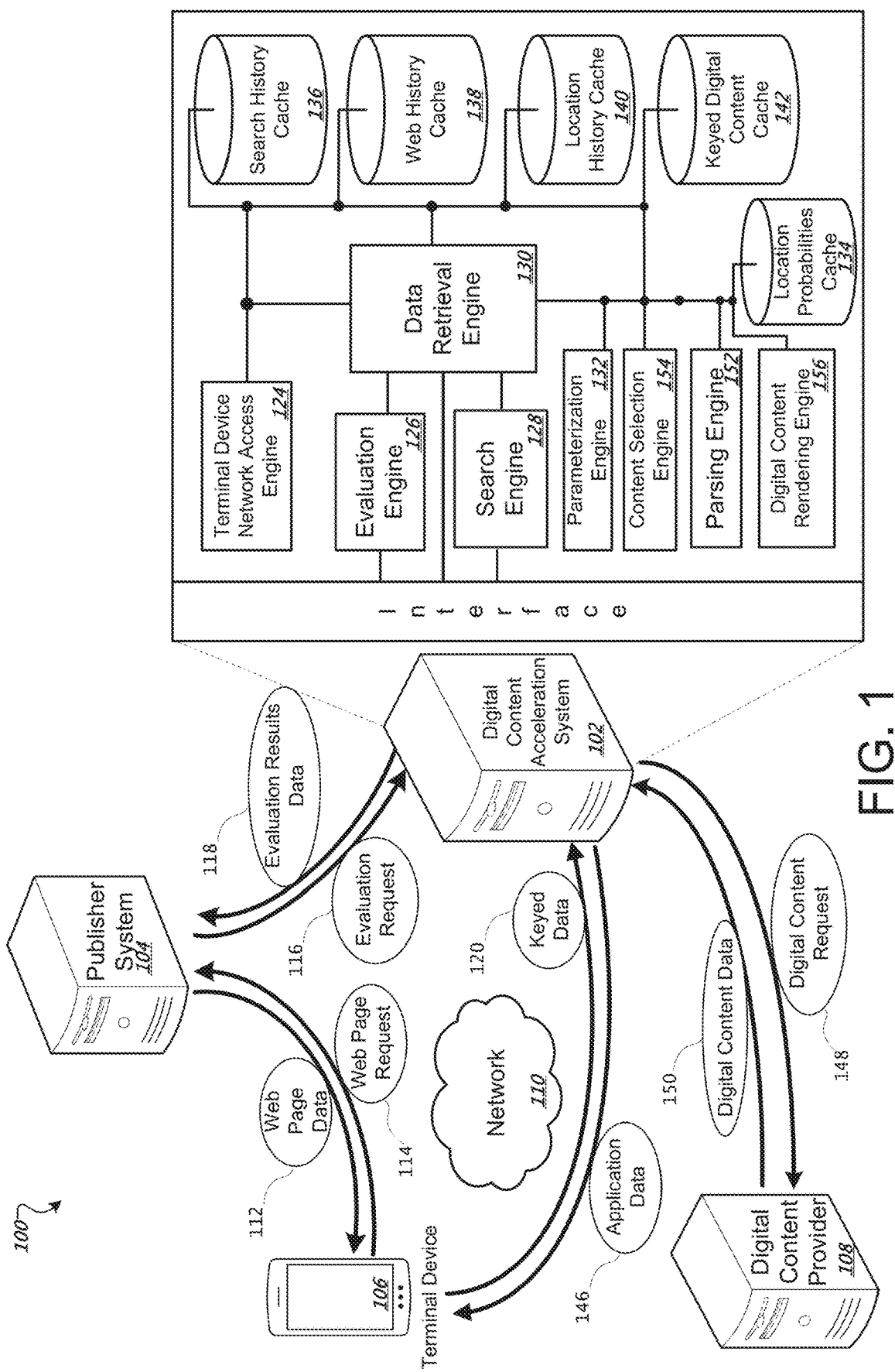
FIG. 1 is a conceptual diagram of a networked environment for digital content delivery acceleration.

This document describes a system that accelerates digital content delivery to a terminal device, such as when a terminal device is browsing the Internet. In some situations, the digital content is related to geographical locations or institutions. The system accelerates content delivery by accessing keyed data maintained using a keyed database. Generally, keyed data includes data associated with (e.g., stored with, transmitted with, pointing to, etc.) a key (e.g., a unique identifier) and/or a key itself, as described in further detail below. Generally, a keyed database includes a database in which data entries or records are associated with or indexed with keys, e.g., for subsequent retrieval. Based on processing and evaluation of the keyed data, the system generates predictions of locations or institutions that are relevant to the application of a terminal device and pre-retrieving and caching content based on the predictions. Generally, the acceleration discussed herein includes a decrease in latency of content delivery, e.g., relative to a latency incurred in the delivery of content independent of the pre-retrieval and caching. However, location data that is useful for predicting future locations can be sparse and unsuitable for making predictions of future locations for which the terminal device might request digital content. The system uses other data, such as search data and web history data, to make predictions for locations for which digital content might be requested the terminal device. Search data and web history data provide a more robust source of data related to a terminal device for making predictions about locations for which the terminal device might request digital content.

When a terminal device requests digital content from a system such as a publisher system, several processes are initiated in response to the request. These processes, which are used to assemble the web page or application interface that is served to the terminal device, include one or more requests made to various systems connected by the Internet and computations by the various systems, and take time. The content delivery acceleration system described below reduces the time latency between the request of a terminal device for digital content and the assembly and service of the digital content to the terminal device, relative to a latency of assembling and service of the web page to the terminal device independent of using the content delivery acceleration system. The content delivery acceleration system reduces the latency by completing the processes in advance of the digital content request by the terminal device by pre-computing and requesting data needed.

For example, the content acceleration delivery system pre-computes (e.g., prior to receiving a request) evaluation results (e.g., auction results, scoring results, or the results of another evaluation process) and requests digital content (e.g., video clips, audio clips, images, text, or a combination thereof) from a content provider system (e.g., a third-party content provider) in advance of the terminal device requesting the digital content. The described system may provide for one or more benefits, such as serving relevant digital content to the terminal device without a latency caused by retrieval of the digital content.

Referring to FIG. 1, networked environment 100 includes a digital content delivery acceleration system 102 that is configured to communicate (e.g., over a network 110) with a publisher system 104, a terminal device 106, and a digital content provider 108. The digital content delivery acceleration system 102 includes a computing system (e.g., a server system). The digital content delivery acceleration system 102 includes an interface 144, a data retrieval engine 130, a terminal device network access engine 124, an evaluation engine 126, a search engine 128, a parameterization engine 132, a location data cache 134, a search history cache 136, a web history cache 138, a location history cache 140, and a keyed digital content cache 142, a parsing engine 152, a content selection engine 154, and a digital content assembly engine 156. For example, the one or more caches described above are keyed databases, such that individual data records are associated with a key (e.g., a user identifier or other unique identifier). The keyed databases are configured to store the keyed data 120 received from the terminal device 106. An engine comprises one or more of a computer processor, server, server system, software module, or any combination thereof.

The digital content delivery acceleration system 102 receives keyed data 120 from one or more terminal devices, such as terminal device 106, over the network 110. The keyed data includes data associated with a unique key, such as, e.g., an identifier. There are various types of keyed data, including, e.g., a search history of a user, a web history (e.g., a browsing history) of a user, a location history (e.g., prior geographic locations or landmarks that have been visited) of a user, an identifier for an application of the device 106, and other data related to past behavior of the terminal device 106. The digital content delivery acceleration system 102 predicts which locations (e.g., geographic locations on a virtual geographic map) are relevant to the application of the terminal device 106 based on the keyed data 120 received from the terminal device 106. The digital content delivery acceleration system 102 predicts what data or functions will be requested by another device or system based on the keyed data 120 and predicted locations. The digital content delivery acceleration system 102 can perform the functions or retrieve relevant data in advance of a request for data (or content) by another device or system, such as the publisher system 104 and the terminal device 106.

The digital content delivery acceleration system 102 predicts, based on the predicted locations, which data to fetch for use for one or more applications, such as for inclusion in an application user interface. The digital content delivery acceleration system 102 fetches data associated with (e.g., targeted to, related to, relevant to, etc.) one or more of the predicted locations. For example, when the terminal device 106 is using a global positioning system (GPS) application, the digital content delivery acceleration system 102 receives the location data and predicts which nearby locations are relevant to the user of the terminal device 106 based on the keyed data 120 and current location of the user.

The digital content delivery acceleration system 102 fetches application data 146 (described in further detail below) about one or more of the predicted locations for delivering to the terminal device 106 in response to an expected request for the application data 146. For example, based on keyed data 120 indicative of a high relevance for a particular location, the digital content delivery acceleration system 102 can fetch digital content associated with the particular location and prepare the digital content to be sent to the terminal device 106 in anticipation of a request for the digital content.

When the digital content associated with (e.g., relevant to, related to, targeted to, presented with, stored with, pointing to, etc.) the relevant particular location is requested, the digital content delivery acceleration system 102 can send the digital content without the latency caused by fetching the data. For example, the digital content delivery acceleration system 102 can determine which digital content to send to the terminal device 106 based on the determined relevance of the data associated with a particular location. As such, the digital content delivery acceleration system 102 can reduce network traffic and lower bandwidth requirements by sending data that is more relevant relative to other data that is not as relevant for a function of the terminal device 106. For example, the relevance is based on the keyed data 120 and the current location of the terminal device 106, such that a highly relevant but distant location might be ranked lower for data retrieval or display relative to a less relevant but closer location. For example, the digital content delivery acceleration system 102 determines relevance based on the keyed data 120 and does not use the current location of the terminal device 120 to determine relevance for digital content retrieval or display.

The digital content delivery acceleration system 102 can include an application that is installed or run on the terminal device 106. The application can retrieve digital content for later use, such as for presentation in a user interface. For example, the digital content delivery acceleration system 102 can retrieve digital content and send it to the terminal device 106 when the terminal device 106 is online so that the digital content can be used during later offline use of the terminal device 106 or when bandwidth restrictions or cost increases, such as when a mobile network is being used instead of a local or WiFi network.

For example, the terminal device 106 can perform a search for nearby locations and request digital content or application data 146 related to the nearby locations. Application data 146 includes image files, audio files, text files, method or system files, search results, cached data, or other resources that are used for operation of an application for a computing device, such as terminal device 106. The digital content delivery acceleration system 102 can send application data 146 representing a subset of locations near the terminal device 106, such as within a predetermined radius of the terminal device 106, up to a predetermined number, or above a threshold relevance, based on the keyed data 120.

Determining which locations are a part of the subset and ranking the locations can be based on how relevant each restaurant is to the terminal device 106. For a location in the subset, such as if the location exceeds a relevance threshold determined by the digital content delivery acceleration system 102, the digital content delivery acceleration system 102 retrieves application data 146 associated with the location and stores the application data 146 in the location data cache 134.

When the application data 146 is requested by the terminal device 106 or another device (such as the publisher system 104), the digital content delivery acceleration system 102 can send the application data 146 without a latency that would occur if the digital content delivery acceleration system 102 were to fetch the application data 146 in response to the request. For example, digital content of the application data 146 can be a name of the location or other identifier of the location, a URL to a website associated with the location, an advertisement for the location, a news article about the location, a review of the location, a visually presented icon (e.g., a map pin) on a virtual geographic map showing the geographic location of the location, directions to the location from the current location of the terminal device 106, an image or video about the location, and so forth. For example, the digital content delivery acceleration system 102 suggests or recommends one or more locations to visit or a path for visiting one or more locations based on the determined relevance of a location in the subset of locations.

In some situations, the digital content delivery acceleration system 102 predicts, based on the predicted locations, which web pages will be requested by the terminal device 106 from the publisher system 104. The digital content delivery acceleration system 102 thus determines which evaluation(s) (e.g., auctions) of digital content to perform for serving to the publisher system in response to a request 116 for evaluation results data 118. The evaluation(s) can be for one or more digital content slots of the web page. The digital content delivery acceleration system 102 performs the evaluation(s) in advance of a request 116 for evaluation results data from the publisher system 104. For example, the digital content delivery acceleration system 102 pre-caches the evaluation results.

When the evaluation results data are requested, the digital content delivery acceleration system 102 responds by sending the pre-cached evaluation results without the latency caused by performing the evaluation in response to the request 116. For example, the digital content delivery acceleration system 102 responds with pre-fetched digital content data 150 for populating the digital content slot of the web page. The digital content delivery acceleration system 102 thus responds without a delay caused by fetching the digital content data 150 in response to the request 116. For example, the evaluation results data 118 can include a digital content tag that indicates digital content data 150 (e.g., using an identifier or URL) to be included with content provided by the publisher system 104, such as for presentation with content provided by the publisher system 104 or inclusion on a web page hosted by or provided by the publisher system 104.

The publisher system 104 includes a computing system (e.g., a server system) that is configured to receive requests to deliver digital content (e.g., web page data 112) to other systems such as the terminal device 106. The publisher system 104 requests data from the digital content delivery acceleration system 102 to fill digital content slots on various web pages of the publisher before serving the digital content to the terminal device 106. A digital content slot includes a location in a web page designated by a content tag (e.g., a digital content tag). Page assembly operations populate the content slot with digital content data based on the digital content tag associated with (e.g., referencing, pointing to, selected for, etc.) the digital content slot.

The terminal device 106 includes a computing device, such as a laptop, tablet, mobile phone, or other computing device. The terminal device 106 sends (e.g., transmits) a request for digital content (e.g., a web page request 114) to the publisher system 104, to the digital content delivery acceleration system 102, or both. The terminal device 106 can include a GPS receiver for determining the location of the terminal device 106. For example, an application or other program running on the terminal device 106 can request application data 146 from the digital content delivery acceleration system 102. In some situations, a maps application running on the terminal device 106 requests map data stored in the digital content delivery acceleration system 102. For example, the terminal device 106 requests application data 146 from another system and also sends the request to the digital content delivery acceleration system 102 so that the digital content delivery acceleration system 102 can check to determine whether the application data 146 has been pre-fetched. The terminal device 106 sends keyed data 120 to the digital content delivery acceleration system 102. For example, the keyed data 120 is different than a device identifier of the terminal device 106. For example, the keyed data 120 includes a user identifier indicative of a profile of the user for an application installed or otherwise running on the terminal device 106 or for a program associated with (e.g., configured to interact with, etc.) the digital content delivery acceleration system 102. For example, the user identifier is associated with (e.g., grouped with, pointing to, etc.) the terminal device 106 because the terminal device 106 is sending the keyed data 120 indicative of the user identifier. For example, the user identifier is indicative of user demographics. The keyed data 120 is received by the digital content delivery acceleration system 102 and stored in one or more of the search history cache 136, the web history cache 138, and the location history cache 140.

The digital content provider 108 is configured to receive a request for digital content data (e.g., application data 146 or digital content data 150), such as digital content request 148, and to serve the requested digital content data 150 as a response to the request, such as sending digital content data 150 to the digital content delivery acceleration system 102. The digital content provider 108 can include an application server that serves application data 146 of an application running on or associated with (e.g., installed on, etc.) the terminal device 106. For example, the digital content provider 108 includes a server that sends digital content data 150 that is indicated by a content tag related to a web page or that is selected by the evaluation engine 126 for presentation in a web page.

The digital content delivery acceleration system 102 receives and responds to requests over the network 110 (e.g., the Internet) for one or more of evaluation results data 118, search results, application data 146, digital content data 150, and other data using several modules and subsystems. The digital content delivery acceleration system 102 includes the communication interface 144 configured to communicate with one or more of the publisher system 104, the terminal device 106, or the digital content provider 108 over the network 110. The communication interface 144 communicates data of the received requests from the network 110 to one or more subsystems or modules of the digital content delivery acceleration system 102, such as the evaluation engine 126, the search engine 128, or the data retrieval engine 130.

The data retrieval engine 130 analyzes the data being processed by the digital content delivery acceleration system 102 and routes data to an appropriate subsystem, such as the terminal device network access engine 124, the parameterization engine 132, the evaluation engine 126, or the search engine 128. The data retrieval engine 130 stores data (e.g., for future operations) in one or more caches of the digital content delivery acceleration system 102 and sends the stored data to the subsystem that requests the data. For example, the one or more caches include the search history cache 136, the web history cache 138, the location history cache 140, and the keyed digital content cache 142. For example, the data retrieval engine 130 retrieves, in response to receiving an item of keyed data 120 from the terminal device 106, one or more of search data indicative of a search history associated with (e.g., related to, stored with, etc.) the item of keyed data from the search history cache 136, web history data indicative of one or more web pages accessed by the terminal device 106 from the web history cache 138, location data from the location history cache 140, and so forth.

Once the keyed data 120 are received, a parsing engine 152 of the digital content delivery acceleration system 102 parses the keyed data 120 for attributes that are stored in the one or more caches, such as for use by the terminal device network access engine 124. The digital content delivery acceleration system 102 can associate the attributes with a terminal device 106 or user. Data co-occurrences are determined and can be stored or sent to the terminal device network access engine 124. The digital content delivery acceleration system 102 uses one or more techniques for determining a data co-occurrence, such as matrix factorization, low rank approximation, such as alternating least squares, singular value decomposition, and the like. The determined data co-occurrences, or relationships in the data, can be stored in the one or more caches or sent to the terminal device network access engine 124.

For example, for a search, data co-occurrences include keywords or key phrases that are used together or in a related way. For example, data co-occurrences include identifiers of web pages that are viewed sequentially or frequently viewed sequentially, locations that are visited or searched sequentially or within a threshold amount of time, and so forth. For example, data co-occurrences include types of locations that are similar in nature, such as gas-stations, restaurants, etc.

An attribute of keyed data 120 is time data. The digital content delivery acceleration system 102 determines data co-occurrences by comparing time data associated with (e.g., related to) other data of the keyed data 120. For example, if a particular web page is always or very frequently visited before another web page, the data co-occurrences is known by the digital content delivery acceleration system 102 to be asymmetric in time. For example, if a series of locations are frequently visited or searched in a particular order, the digital content delivery acceleration system 102 uses that information for making predictions.

The terminal device network access engine 124 uses the data from the one or more caches to make predictions of which locations are relevant for a function of the terminal device 106. The terminal device network access engine 124 uses a deep learning network to train a model using keyed data 120 retrieved a number of terminal devices, such as terminal device 106. Some terminal devices 106 have a location history, but not all terminal devices have a location history. The digital content delivery acceleration system 102 uses the location history data of the number of terminal devices that have a location history to train the machine learning model. For example, the digital content delivery acceleration system 102 determines which locations are more likely to be visited regularly than other locations by the same terminal devices, such as daily, weekly, hourly, etc. For example, the digital content delivery acceleration system 102 determines which locations are commonly visited sequentially or at a particular time of day (e.g., a coffee shop is more likely to be visited in the morning than a dance club).

The digital content delivery acceleration system 102 uses a trained model and the keyed data 120 of a terminal device 106 to make location predictions for that terminal device 106. This allows the digital content delivery acceleration system 102 to make predictions of locations for a terminal device 106 for which no or little location history exists or is known to the digital content delivery acceleration system 102. Since many terminal devices have location history deactivated some or all of the time, the use of the trained model and the keyed data 120 and determined data co-occurrences allows for location predictions to be made for these terminal devices. For example, if the keyed data 120 of the terminal device 106 indicates several searches for a particular location several times recently, the digital content delivery acceleration system 102 determines that the particular location has probably or will probably be visited by the user of the terminal device 106. This likelihood can be sent to one or more other systems to initiate other functions, such as retrieving digital content related to the particular location, pre-loading or pre-caching evaluation results data for a web page associated with the particular location, or generating data for presentation on a user interface (such as a map) related to the particular location (as described in more detail in relation to FIGS. 3A-3C).

The terminal device network access engine 124 generates a distribution or array of prediction confidences for a number of locations for the terminal device 106. The predictions are based on the trained model, the keyed data, and other data such as the currently location of the terminal device 106. The terminal device network access engine 124 generates a relevancy score or weighting for each of the locations that has a prediction. For example, the terminal device network access engine 124 determines that a particular location is very likely to be visited by the user of the terminal device 106 under normal circumstances, but that the particular location is very far away from the current geographical location of the terminal device 106.

The particular location is assigned a low relevance score or weighting despite the otherwise high probability determined from the keyed data 120 and trained model. For example, the terminal device network access engine 124 determines that a terminal device at a first location rarely travels to a second location, such as from a restaurant to another restaurant. The second location can be assigned a low relevance score when the terminal device 106 is at the first location or near the first location. Other such examples are possible, such as a high correlation between first and second locations, low correlations between particular location regions on a virtual geographic map (such as situations where users rarely leave their neighborhoods or stray from public transportation), a high correlation with a time of day and a particular location (e.g., a coffee shop at 7:00 AM), and so forth. For example, the terminal device network access engine 124 can determine if the user of the terminal device 106 owns car (e.g., if the user selects an indicator in an application). Different locations can be predicted for the terminal device 106 based on information that the user is in a car, on foot, etc.

The terminal device network access engine 124 uses the data from the one or more caches to make predictions of which web page will be requested 114 by the terminal device 106 from the publisher system 104, and in turn, which evaluation data will be requested by the publisher system 104 in the evaluation data request 116. For example, the terminal device network access engine 124 analyzes the web page data 112 recently requested by the terminal device 106 and makes a prediction of the next web page that will be requested by the terminal device 106.

The prediction system 124 uses the predicted next web page to determine location predictions as described above. For example, the predicted web page can be a part of a series of web pages in time, demonstrating a data co-occurrence. Alternatively, the digital content delivery acceleration system 102 uses predicted location(s) to predict a next web page that will be accessed by the terminal device 106. Other functions can also be initiated based on the predicted location or web page. For example, the terminal device network access engine 124 sends the prediction to the parameterization engine 132 using the data retrieval engine 130. The parameterization engine 132 populates callout parameters for the predicted web page and sends the parameters to the evaluation engine 126 to precompute an evaluation for digital content slots of the predicted web page. For example, digital content targeted for the web page can be pre-fetched.

The terminal device network access engine 124 includes a machine-learning system for analyzing the web page data 112 and the terminal device 106 and subsequently generating predictions data on the likelihood that the web page data 112 of the additional web page will be requested. The terminal device network access engine 124 trains using keyed data 120 from one or more terminal devices, such as terminal device 106. For example, the terminal device network access engine 124 trains using data collected from the browser application of the terminal device 106, such as user click data.

The terminal device network access engine 124 uses data related to a web page (e.g., the web page most recently requested by the terminal device 106) or an additional web page, such as content of the web page loaded from one or more of caches. The terminal device network access engine 124 trains using the user click data of one or more digital content. The terminal device network access engine 124 trains the machine-learning algorithms, e.g., on a batch basis, an ongoing basis and so forth. For example, the terminal device network access engine clusters the one or more attributes, into one or more topic clusters. The topic clusters are each indicative of a topic of a predetermined list of topics. For example, the words café, coffee, diner, and donut may all be part of a cluster representing breakfasting options, which can be relevant in the morning hours. The terminal device network access engine 124 transforms, using the trained model, the topic clusters into location data indicative of one or more geographic locations relevant to the terminal device 106. The terminal device network access engine 124 uses other methods of training based on data stored by the digital content delivery acceleration system 102 using one or more machine-learning algorithms.

The terminal device network access engine 124 generates a distribution or array of confidences for one or more locations. A confidence score represents the likelihood that the terminal device 106 will request data related to a location or that a user of the terminal device 106 will travel to the location. For example, the predictions data includes an array of location identifier-confidence score pairs. The confidence score includes a scaler, normalized value. The array can be sorted and stored in an indexed cache, such as the location data cache 134.

The terminal device network access engine 124 applies a threshold of certainty to the confidence scores of the predictions data generated by the terminal device network access engine 124. The terminal device network access engine 124 chooses the threshold based on the machine-learning algorithms described above such that not too many locations are included in the predictions data but also to prevent unnecessary retrieval or storage of digital content. For example, the threshold includes a selection of a set number of locations for which the digital content delivery acceleration system 102 retrieves digital content. For example, the threshold includes a set scalar value of the confidence scores. For example, the threshold varies based on the machine learning algorithms described above.

The evaluation engine 126 pre-computes evaluation data before the terminal device 106 requests a predicted web page from the terminal device 106, such as a web page relevant to a predicted location. For example, pre-computing the evaluation results data 118 includes a process wherein the evaluation engine 126 runs the evaluation and determines the results of the evaluation in advance of receipt of a request 116 for evaluation data from the publisher system 104 for the evaluation results. When the publisher system 102 requests the evaluation data 116, the content delivery acceleration system 102 responds using the precomputed evaluation results data 118 which reduces latency in providing results, as the evaluation is not performed in response to the evaluation request 116.

For example, when the terminal device 106 sends a web page request 114 to the publisher system 104, such as for a web page or digital content associated with (e.g., relevant to) a predicted location, the publisher system 104 requests the evaluation data 116 from the digital content delivery acceleration system 102. The digital content delivery acceleration system 102 responds to the request for the evaluation data 116 by sending the pre-computed evaluation results data 118 to the publisher system 104. Since the evaluation results are pre-computed, rather than computed upon request, the latency experienced by the publisher system 104 and thus the terminal device 106 is reduced relative to the latency experienced independent of pre-computing the evaluation results.

The data retrieval engine 130 sends the predictions data to the parameterization engine 132. The parameterization engine 132 includes a machine-leaning system that populates the eligibility values (e.g., RTB callout parameters) for digital content, such as web pages, associated with (e.g., related to or relevant for, etc.) locations identified by the terminal device network access engine 124. For example, the parameterization engine 132 uses eligibility logic (e.g., RTB logic), such as platform identification signals. The parameterization engine 132 generates and associates eligibility values with each of the web pages identified by the terminal device network access engine 124 such that the evaluation engine 126 runs a digital content evaluation for a web page relevant to a predicted location. For example, the parameterization engine 132 generates an eligibility value for each of the digital content slots for the web page, application user interface, etc.

The parameterization engine 132 trains a machine learning model using evaluation data from one or more content evaluations. For example, digital content (e.g., web pages) associated with more popular locations will be better trained than digital content associated with less popular locations, and have better eligibility values. For example, the evaluation engine 126 (e.g., an ad exchange) includes a third-party evaluation engine. The parameterization engine 132 sends the eligibility values to the evaluation engine 126 via the data retrieval engine 130.

The evaluation engine 126 receives the eligibility values and runs an evaluation process (e.g., auction, scoring process, or another evaluation technique) for the digital content represented by the eligibility values. For example, the evaluation engine 126 includes a third-party evaluation engine. The evaluation engine 126 runs an evaluation process for each of the predicted web pages and generates pre-computed evaluation results data 118. The pre-computed evaluation results data 118 represents digital content for populating one or more digital content slots associated with the predicted locations. For example, the pre-computed evaluation results data 118 includes one or more links to network resources (e.g., URLs), the resources configured to serve the digital content associated with the predicted location. For example, the score for digital content during the evaluation process is based on the confidence score of the predicated location associated with the digital content slot. If a location is highly relevant, digital content is selected for presentation rather than other digital content associated with a less-relevant location, so that digital content which is more relevant is sent to and presented on the terminal device 106.

The data retrieval engine 130 manages dataflow between modules and subsystems of the digital content delivery acceleration system 102. The data retrieval engine 130 handles the keyed data 120, predictions data from the terminal device network access engine 124, and pre-computed evaluation results data 118 from the evaluation engine 126. The data retrieval engine 130 routes the predictions data to the parameterization engine 132 and the eligibility values data to the evaluation engine 126. For example, the data retrieval engine 130 stores data as required into one of the one or more caches. For example, the data retrieval engine 130 stores location probabilities data in the location probabilities cache 134, retrieved digital content associated with predicted locations in the keyed digital content cache 142, location history data in the location history cache 140, web history data in the web history cache 138, and search history data in the search history cache 136.

The search engine 128 includes one or more computing devices (e.g., servers) configured to receive a search query 158 and return search results from the Internet. The search results include a mix of web pages, images, and other types of files. The search engine 128 also mines data available in databases or open directories. The search engine 128 maintains real-time information by running an algorithm on a web crawler. For example, the search engine 128 includes a third-party search engine 128.

The digital content assembly engine 156 pre-assembles the digital content associated with the particular geographic location for rendering by the terminal device 106. For example, the digital content assembly engine 156 pre-assembles the digital content to send to the terminal device or other system requesting the digital content in response to a request from the terminal device 106 for the digital content, such as for an application or program of the terminal device 106. For example, the pre-assembly of the digital content can be performed by the publisher system 104 when the publisher system 104 is serving a web page to the terminal device 106. The assembled data is received and rendered by the terminal device 106. For example, the digital content delivery acceleration system 102 sends the pre-assembled digital content to the terminal device 106 during a period when the terminal device is online, and in advance of a request for the digital content being sent from the terminal device 106, such that the digital content is available to the user of the terminal device in the event that the user subsequently issues a request for the digital content during a period when the terminal device is offline.

The search history cache 136 includes a data store in memory or on disk, e.g., a database such as a distributed database. The search history cache 136 includes data representing search queries sent by the terminal device 106. The digital content delivery acceleration system 102 caches search queries because the search queries provide a robust data set for a terminal device 106 from which predictions of locations can be made, relative to using a location history for the terminal device. For example, a terminal device 106 might perform dozens or more searches in a day, while the location history for the device might be deactivated or return one or two locations.

The digital content delivery acceleration system 102 associates some or each of the search queries stored in the search history cache 136 with a timestamp of when the search query was sent by the terminal device 106 to the search engine 128. The time stamps can provide ordering information to the terminal device network access engine for predicting locations. For example, a location can be more or less likely to be a next location for which the terminal device 106 requests digital content based on the prior location data requested prior searches performed, etc.

The web history cache 138 stores web page data 112 and a history of web pages requested by the terminal device and includes a data store in memory or on disk, e.g., a database such as a distributed database. For example, the web history cache 138 stores web page data 112 from any web page that is analyzed, crawled, or otherwise accessed by modules or subsystems of the digital content delivery acceleration system 102. For example, the web page data 112 and the web history data in the web page data cache 138 train the terminal device network access engine 124 and are used for making predictions on future locations. The web history data are stored because they provide a robust data set for a terminal device 106 from which predictions of locations can be made, relative to using a location history for the terminal device. For example, a terminal device 106 might request dozens or hundreds of web pages in a day but might have location history deactivated or otherwise not report a large number of locations.

The location history cache 140 stores location history data for the terminal device 106. The location history cache 140 includes a data store in memory or on disk, e.g., a database such as a distributed database. The digital content delivery acceleration system 102 populates the location history cache 140 using data gathered by an application on a terminal device 106, such as an application using the GPS receiver. The location history data includes data representing geographic locations that the terminal device 106 has reported to the digital content delivery acceleration system 102. The location history data trains the terminal device network access engine 124 and the digital content delivery acceleration system 102 uses the location history data for generating predictions data and confidence scores.

The keyed digital content cache 142 stores digital content 150 that has been retrieved for one or more predicted locations having a confidence score over a threshold. The keyed digital content cache 142 includes a data store in memory or on disk, e.g., a database such as a distributed database. The digital content can include any digital content associated with the location that might be requested by the terminal device 106, such as web page data 112, digital content for populating digital content slots on a web page associated with the predicted locations, application data 146 associated with the predicted locations, and the like. The digital content includes one or more of text, images, videos, application files, audio, and the like. As stated above, the keyed digital content cache 142 includes a memory of the system. Storing the digital content 150 in a memory reduces the latency for serving the digital content 150 in response to a request for the digital content, such as by the publisher system 104 or the terminal device 106. The latency for serving the digital content 150 in real-time because the system serves the digital content 150 without performing a data query and retrieval from a database.

The location data cache 134 stores location data associated with the locations and includes a data store in memory or on disk, e.g., a database such as a distributed database. For example, the location data cache 134 stores a location identifier, type, geographic location, and other such metadata for categorizing the location and performing location predictions.

The publisher system 104 includes a server or network of servers that host web page content. The publisher system 104 can include a commercial hosting service or an individual server. The publisher system 104 serves web page data 112 to the terminal device 106 in response to requests for web page data 112 from the web addresses hosted by the publisher system 104.

When a terminal device 106 requests web page data 112, the publisher system 104 sends a request for evaluation data 116 from the digital content delivery acceleration system 102 to populate any digital content slots of the requested web page. The publisher system 104 requests the evaluation data 118 from the digital content delivery acceleration system 102. The data retrieval engine 130 of the digital content delivery acceleration system 102 handles the request by checking for pre-computed evaluation results data 118 associated with the web page. If the digital content delivery acceleration system 102 finds pre-computed evaluation results data 118, the digital content delivery acceleration system 102 sends the pre-computed evaluation results data 118 to the publisher system 104. The digital content delivery acceleration system 102 does not need to run an evaluation process for the requested web page digital content in response to the request because the evaluation process has already been run by the evaluation engine 126.

The pre-computed evaluation results data 118 are sent to the publisher system 104, which serves the requested web page to the terminal device 106. The content delivery acceleration system 102 system reduces latency between the request by the terminal device 106 for the web page data 112 and serving of the web page by the publisher system 104, relative to the latency independent of pre-computing the evaluation results and pre-loading the content tags. The latency is reduced because the evaluation engine 126 does not have to run the evaluation in response to the request.

The terminal device 106 includes a laptop, tablet, mobile phone, or other computing device configured to communicate with the publisher system 104 and the digital content delivery acceleration system 102. The terminal device 106 sends a request 114 to a publisher system 104 for a web page, and receives web page data 112 from the publisher system 104 in response to the request. The terminal device 106 includes a GPS receiver for determining the GPS coordinates of the terminal device 106. The terminal device 106 collects keyed data 120 from one or more applications of the terminal device 106 and sends the keyed data 120 to the digital content delivery acceleration system 102. The terminal device 106 can send one or more search queries to the search engine 128.

The terminal device 106 requests digital content from the digital content delivery acceleration system 102 associated with one or more locations. For example, the terminal device 106 running a mapping application can request additional information about one or more of the locations depicted in the mapping application, such as websites associated with the locations, ratings or reviews associated with the locations, images of the locations, and the like. For example, the terminal device 106 running a reservation application can request a reservation for a show or table at one of the locations. The digital content delivery acceleration system 102 stores some or all of the digital content required for responding to such requests for the application.

The digital content delivery acceleration system 102 includes an interface for handling such requests. For example, the digital content delivery acceleration system 102 can be configured to retrieve particular digital content associated with the predicted locations based on the application or programs running on the terminal device 106. For example, if a ratings and reviews program is running on the terminal device 106, the digital content delivery acceleration system 102 can retrieve ratings and reviews required by the application and store them in the keyed digital content cache 142 to reduce a latency that occurs from retrieving the data in response to the request.

The digital content provider 108 includes a server or a network of servers, or similar computing device(s). The digital content provider 108 provides digital content data 150 to digital content delivery acceleration system 102 when requested. For example, the digital content delivery acceleration system 102 requests 148 the digital content data 150 from the digital content provider 108. The digital content delivery acceleration system 102 stores the digital content data 150 in the digital content cache 136. For example, the digital content delivery acceleration system 102 requests digital content from the digital content provider 108 after performing an evaluation using the evaluation engine 126 for one or more web pages (e.g., associated with predicted locations).

The content selection engine 154 retrieves the digital content 150 associated with a particular geographic location of the predicted geographic locations for storing in the keyed digital content cache 142. The particular geographic location is associated with a greater probability relative to other probabilities associated with other geographic locations identified by the terminal device network access engine 124. The content selection engine sends the request 148 for digital content from the digital content provider 108.

Figure 2:
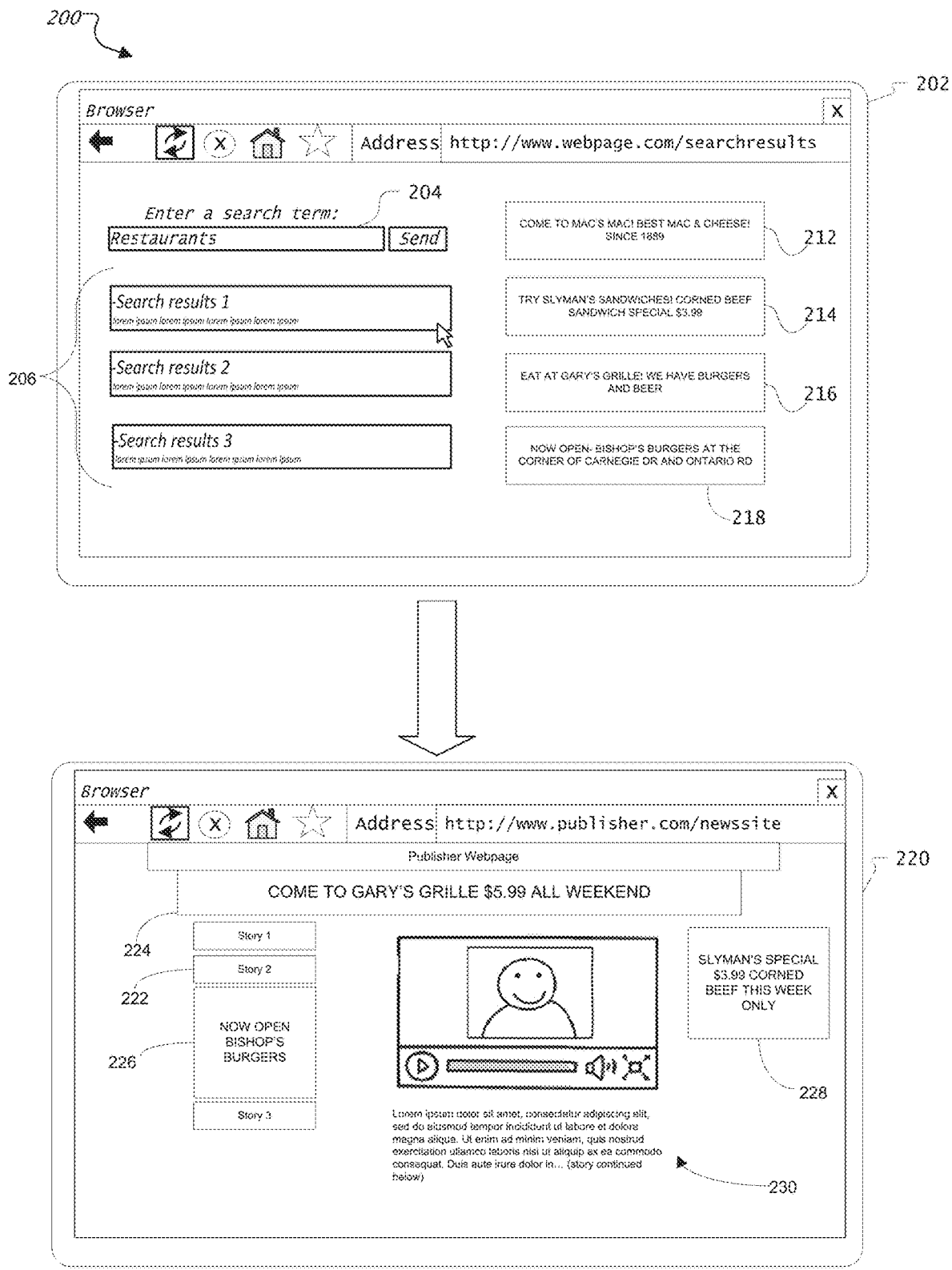
FIG. 2 shows examples of a user interface for digital content delivery acceleration.

Referring to FIG. 2, diagram 200 shows graphical user interfaces 202, 220 that are rendered at least partly based on data from a content delivery acceleration system. Graphical user interface 202 is rendered in an application (e.g., a browser) on a computing device (e.g., terminal device 106). The application collects data on the user's click rates, browsing history, current web page address, and other information that is stored by a content delivery acceleration system (e.g., digital content delivery acceleration system 102 in FIG. 1) and used for training of the predictions engine 124, parameterization engine 132, etc. For example, the user enters a search query 204 onto the web page. For example, the digital content delivery acceleration system hosts the search web page.

The digital content delivery acceleration system receives the search query and provides a search results web page. The search results web page includes text links such as links 206 (e.g., search results). For example, the search results web page includes embedded web page data associated with one or more predicted locations, such as digital content items 212, 214, 216, and 218. The digital content items 212, 214, 216, and 218 each represent a link to additional web pages (e.g., sponsored results) based on the predicted locations of the terminal device network access engine of the digital content delivery acceleration system. For example, if search query of "restaurants" is entered, the digital content delivery acceleration system determines that one or more locations have digital content likely to be requested by the terminal device 106, such as Mac's Mac, Slyman's Sandwiches, Gary's Grille, and Bishop's Burgers. The locations are predicted as described above, such as because it is noon time and the user often searches for sandwiches or visits sandwich shops around noon and would be likely or predisposition to request digital content associated with such a shop, such as by selecting a link to the digital content presented on a web page.

When the user interface 202 is generated and presented on the terminal device 106, the digital content items 212, 214, 216, and 218 are retrieved from a cache (e.g., keyed digital content cache 142 of FIG. 1). The latency of serving the digital content to the terminal device is reduced relative to the latency caused by requesting the digital content items from a remote digital content provider over a network (e.g., digital content provider 108 of FIG. 1). For example, the latency is reduced because the digital content delivery acceleration system does not need to download the digital content over a network, which may cause a latency due to bandwidth limitations, a latency from a digital content provider for serving the requested digital content, and so forth. Additionally, the digital content items 212, 214, 216, and 218 that are presented are more relevant to a user than digital content associated with locations or institutions that are not of interest to the user.

Graphical user interface 220 shows an example of a presented web page on a terminal device (e.g., terminal device 106). The web page includes publisher content 230. The web page includes links to additional web pages associated with the publisher, such as link 222. The web page includes digital content related to predicted locations of the digital content delivery acceleration system, such as banner 224, sidebar item 226, and sidebar item 228. Other digital content related to the predicted locations can be retrieved. Since the locations are predicted prior to the web page being requested, the digital content items such as the banner 224 and the sidebar items 226, 228 are retrieved in advance of the web page being loaded. A latency introduced by retrieving the banner item 224 and sidebar items 226, 228 in response to a request to serve the web page of interface 220 can be reduced or eliminated by retrieving the banner item 224 and sidebar items 226, 228 in advance of the request.

Figure 3A:
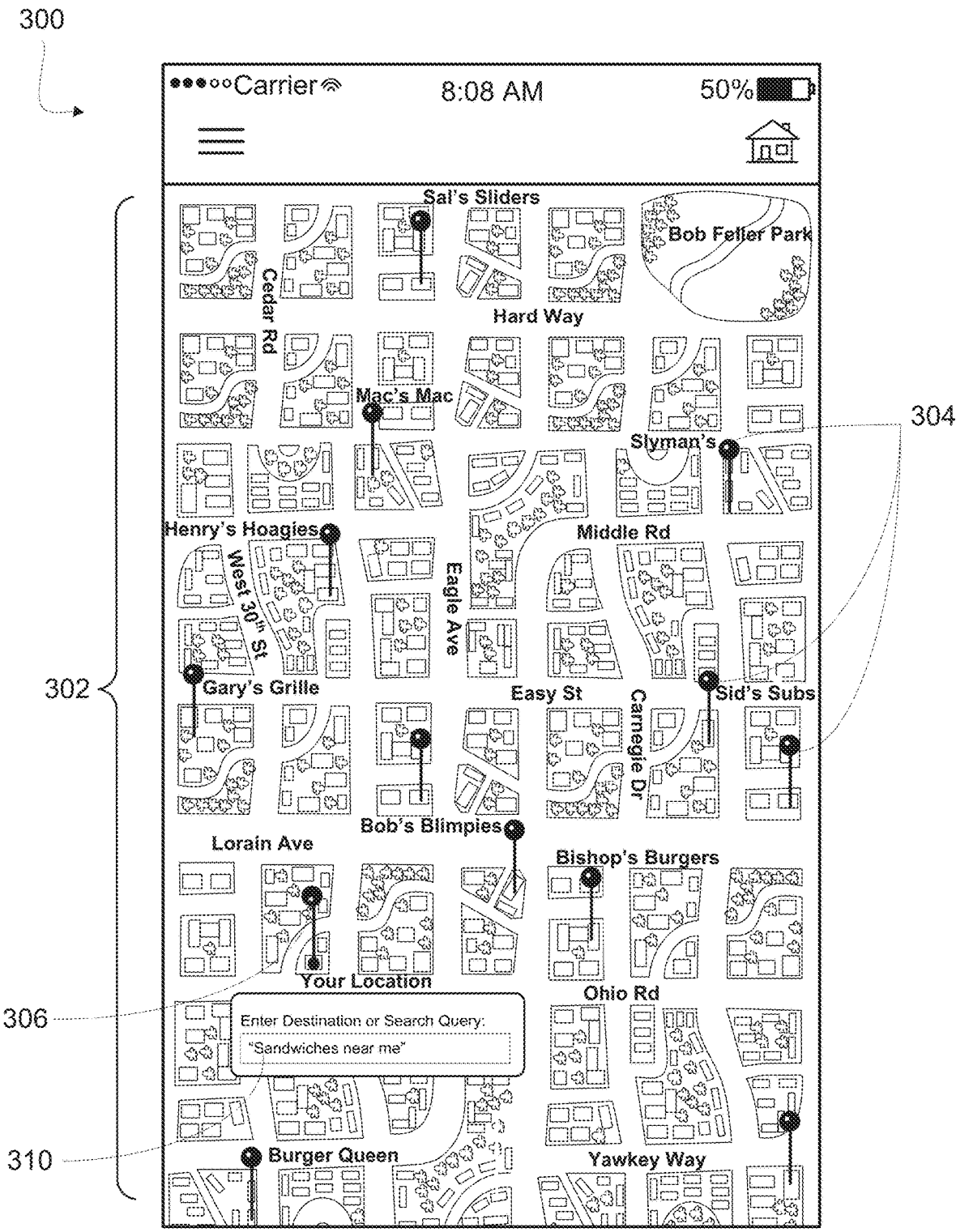
FIGS. 3A-3C are user interfaces for digital content delivery acceleration.
Figure 3B:
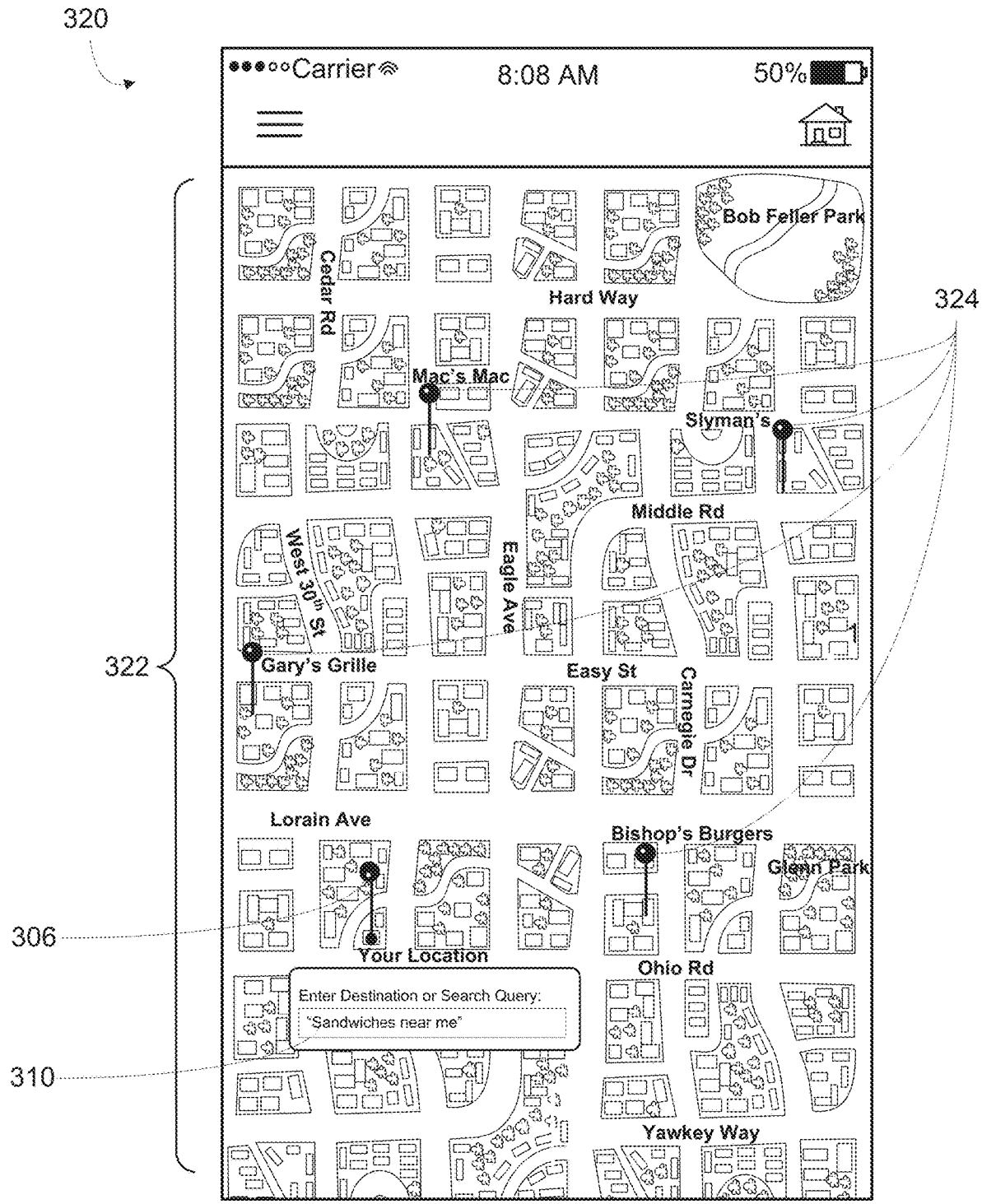
Figure 3C:
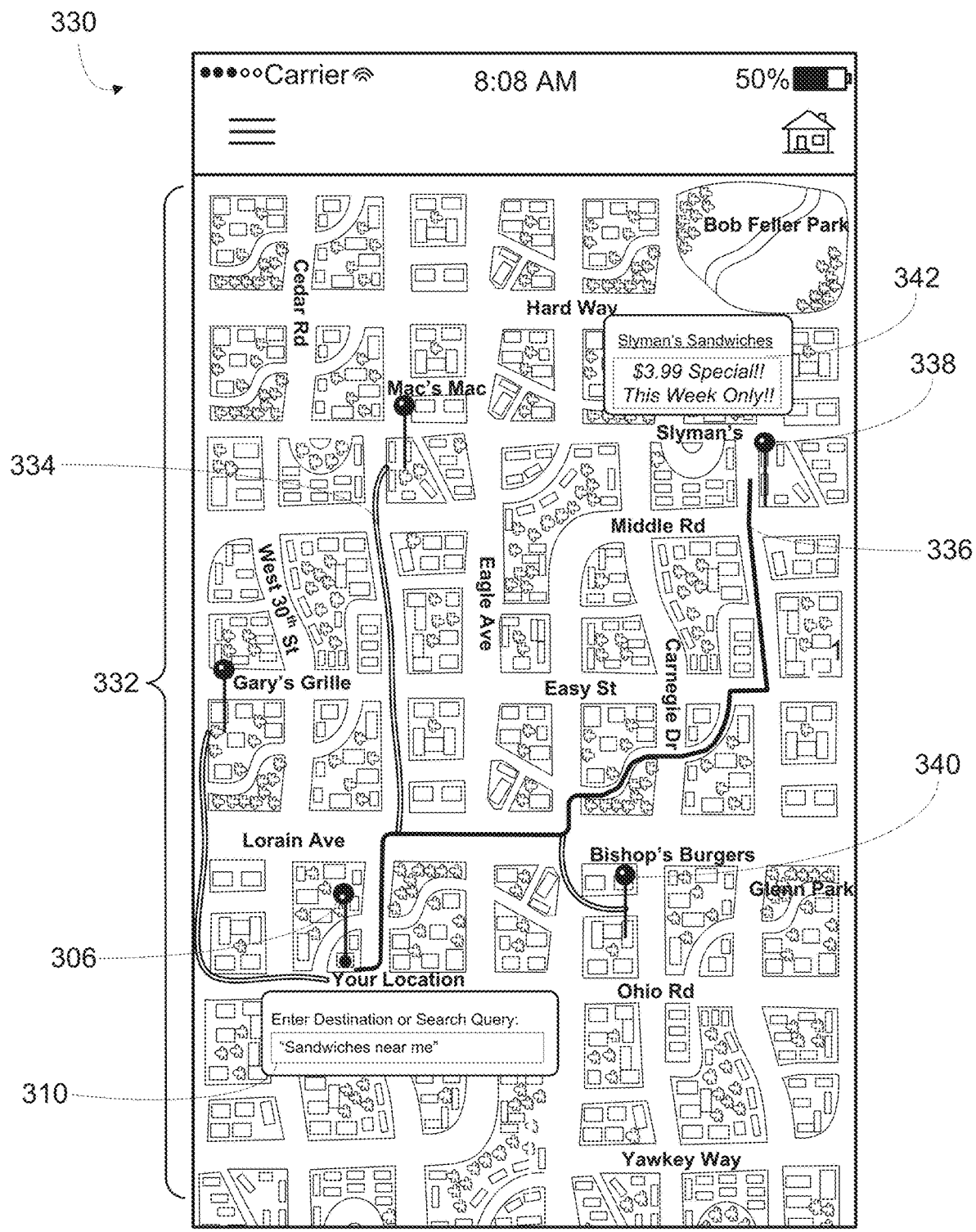

FIGS. 3A-3C show example user interfaces 310, 320, and 330, respectively, for an application of the digital content delivery acceleration system. FIG. 3A shows a user interface 300 that is presented by the terminal device (e.g., terminal device 106 of FIG. 1), such as without predicting locations for the terminal device as described above.

The user interface includes a virtual geographic map 302. The virtual geographic map 302 shows a current location 306 of the terminal device. The virtual geographic map 302 shows one or more other locations that are relevant to a search query 310. The application displays one or more pins, such as pins 304, relating to geographic locations that are relevant to the search query 310.

In the example of FIG. 3A, assume that the search query includes the key phase "sandwiches near me." In this example, the virtual geographic map 302 shows a number of pins at locations on the virtual geographic map 302 representing the geographic locations of sandwich shops relative to the location of the terminal device. If the digital content delivery acceleration system does not make predictions, as in this case, many pins are returned because the application cannot distinguish which locations are more relevant to the user. While some locations are not presented, such as locations that are not relevant to the search query, several of the locations that are presented are not likely to be visited by the user of the terminal device, such as if a user left the location a bad review, is a vegetarian, and so forth. This results in extra bandwidth usage and latency as digital content that is not relevant to the user is being retrieved in response to the search query and presented on the virtual geographic map 302.

FIG. 3B shows a user interface 320 that is presented by the terminal device (e.g., terminal device 106 of FIG. 1), such as with predicting locations for the terminal device as described above. The user interface includes a virtual geographic map 322. The virtual geographic map 322 shows a current location 306 of the terminal device. In response to receiving the search query 310, the digital content delivery acceleration system checks which digital content has been retrieved for the terminal device and serves the digital content to the terminal device. For example, pins 324 can be sent or promoted to be relevant to the user to be presented in response to receiving a particular search query. The application sends less digital content than for interface 300, saving bandwidth usage and increasing the relevance of the data presented on the terminal device. In this example, four pins are presented to the user as options for sandwiches rather than 12 pins as in user interface 300 of FIG. 3A.

FIG. 3C shows a user interface 330 that is presented by the terminal device (e.g., terminal device 106 of FIG. 1). The user interface 330 includes a virtual geographic map 332. The virtual geographic map 332 includes the current location 306 of the terminal device. In response to receiving the search query 310, the user interface 330 presents suggested routes to one or more predicted locations. A primary route 336 to a predicted location 338 that is more relevant than other predicted locations, such as location 340, is shown. Location 338 is determined to be more likely than location 340 by the terminal device network access engine, even though location 340 is closer to the terminal device location 306. Alternate routes, such as route 334, are shown to the other locations. The predicted location can be based on preferences as described above, or other concerns such as whether the location is open for business or whether there is traffic or road closure, etc. Digital content 342 is presented near the location 338, which can entice a user to visit location 338. Digital content 342 is considered highly relevant to a user of the terminal device and has been retrieved in advance of receiving the search query. The digital content 342 can be presented without a latency caused by retrieving the digital content from a remove digital content provider or performing an evaluation of the digital content as described above in response to receiving the search query.

Figure 4:
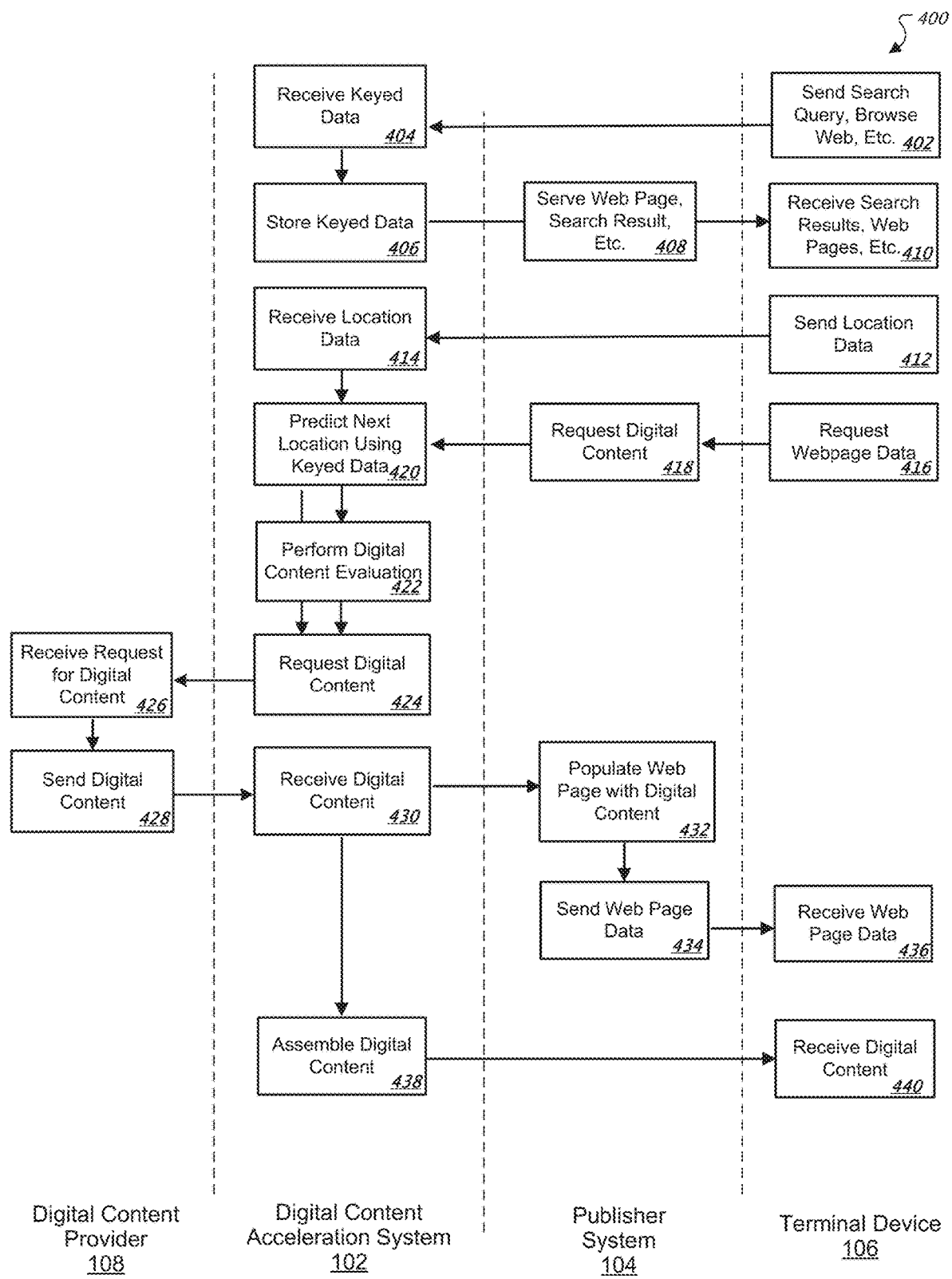
FIG. 4 is a diagram showing actions taken for digital content delivery acceleration.

FIG. 4 shows a diagram representing a process 400 for digital content delivery acceleration. The terminal device 106 sends (402) a search query or other keyed data to the digital content delivery acceleration system 102. The digital content delivery acceleration system 102 receives (404) the keyed data and stores (406) the keyed data. In some examples, the digital content delivery acceleration system 102 uses the keyed data to respond (408) to a request by the publisher system 104 for a web page, search result, etc. The keyed data is received (410) by the terminal device. The terminal device 106 sends (412) location data to the digital content delivery acceleration system 102. The digital content delivery acceleration system 102 receives (414) the location data and generates (420) a prediction of the next locations associated with digital content to be requested. In some examples, the terminal device 106 requests (416) digital content, such as web page data, from the publisher system 104. The publisher system 104 sends (418) a request to the digital content delivery acceleration system 102 for data, such as evaluation results data. The digital content delivery acceleration system 102 performs a digital content evaluation (422) if necessary, such as if evaluation results data are requested by the publisher system 104 and if the evaluation has not already been conducted. The digital content delivery acceleration system 102 requests (424) digital content associated with the predicted locations from the digital content provider 108. The digital content provider receives (426) the digital content request and responds by sending (428) the digital content to the digital content delivery acceleration system 102. The digital content delivery acceleration system 102 receives (430) the digital content. In some examples, such as when a web page is requested by the terminal device 106, the digital content delivery acceleration system 102 sends the digital content to the publisher system 104 which assembles or populates (432) the web page with the digital content. The publisher system 104 sends (434) the web page data to the terminal device 106. The terminal device 106 receives (436) the web page data and presents the data to a user. In some examples, such as when the terminal device 106 is running an application associated with the digital content delivery acceleration system 102, the digital content delivery acceleration system 102 assembles (438) the digital content, such as adding it to a user interface, and sends the digital content to the terminal device. The terminal device receives (440) the digital content and presents the digital content to a user.

Figure 5:
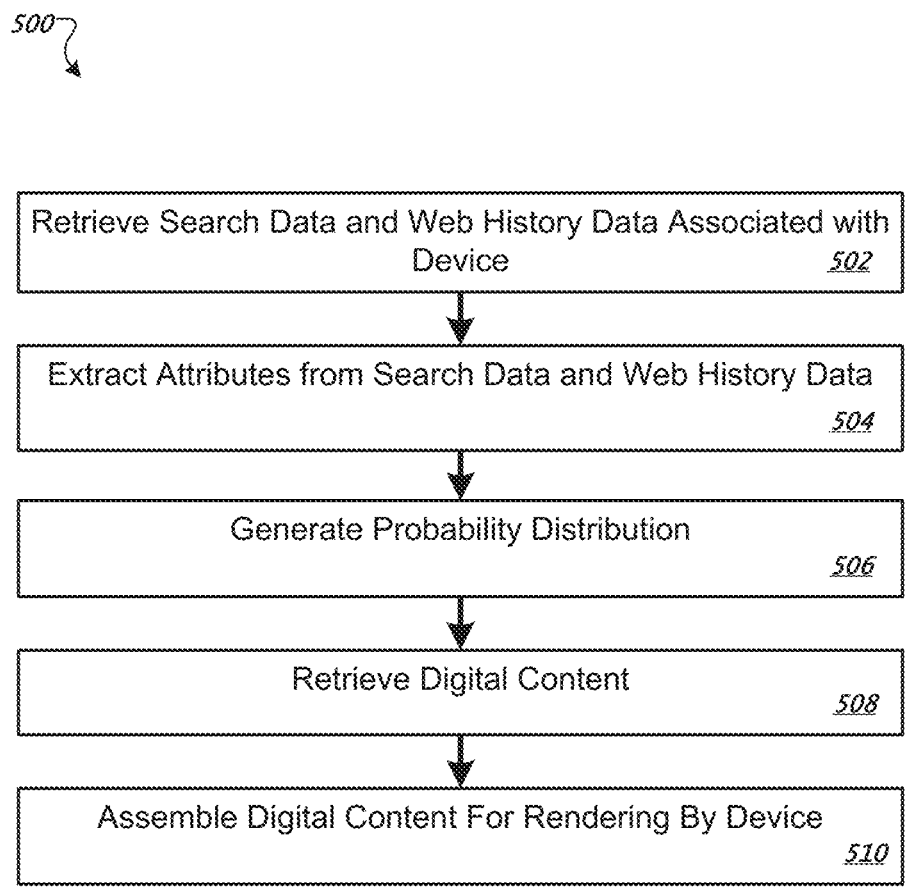
FIGS. 5-6 are flow diagrams showing actions taken for digital content delivery acceleration.

FIG. 5 shows a flow diagram representing a process 500 for digital content delivery acceleration. The digital content delivery acceleration system (e.g., digital content delivery acceleration system 102 of FIG. 1) retrieves (502) search data and web history data associated with the terminal device. The digital content delivery acceleration system extracts (504) attributes from the search data and web history data and generates (506) a probability distribution for several locations, such as described in relation to FIG. 1. The digital content delivery acceleration system retrieves (508) the digital content such as from a remote digital content provider. The digital content delivery acceleration system assembles (510) the digital content for rendering by the terminal device.

Figure 6:
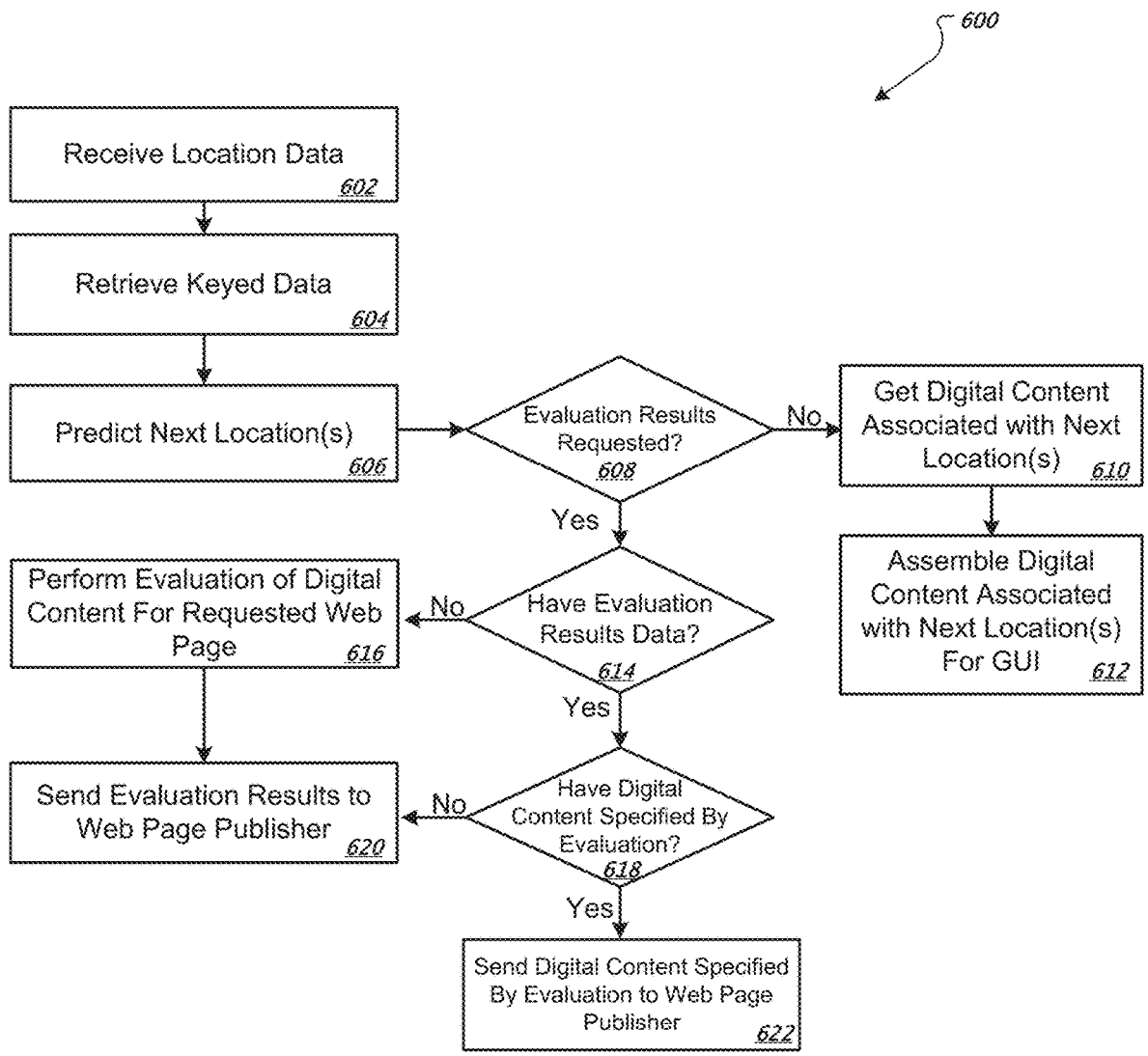

FIG. 6 shows a flow diagram representing a process 600 for digital content delivery acceleration. The digital content delivery acceleration system (e.g., digital content delivery acceleration system 102 of FIG. 1 receives (602) location data, such as from a terminal device. The digital content delivery acceleration system retrieves (604) keyed data, such as keyed data associated with the terminal device, and predicts (606) the next locations for which digital content will be requested, such as from a terminal device. If the evaluation results data are requested (608), such as by a publisher system, the digital content delivery acceleration system checks to determine whether the evaluation results data are obtained. If the evaluation results are not requested, the digital content delivery acceleration system gets (610) the digital content associated with the next location(s) and assembles (612) the digital content associated with the next location(s), such as for a user interface (e.g., user interface 322 or 332).

The digital content delivery acceleration system checks (614) to determine if the evaluation results are obtained. If the digital content delivery acceleration system does not have the evaluation results data, the digital content delivery acceleration system performs (616) the evaluation of the digital content for the requested web page. If the evaluation results data are obtained, the digital content delivery acceleration system checks (618) to determine whether the digital content specified by the evaluation are obtained. If the digital content specified by the evaluation are not obtained, the digital content delivery acceleration system sends (620)

the evaluation results to the requesting web page publisher (e.g., publisher 104 of FIG. 1). If the digital content specified by the evaluation results are obtained, the digital content delivery acceleration system sends (622) the digital content specified by the evaluation results to the publisher system.

Figure 7:
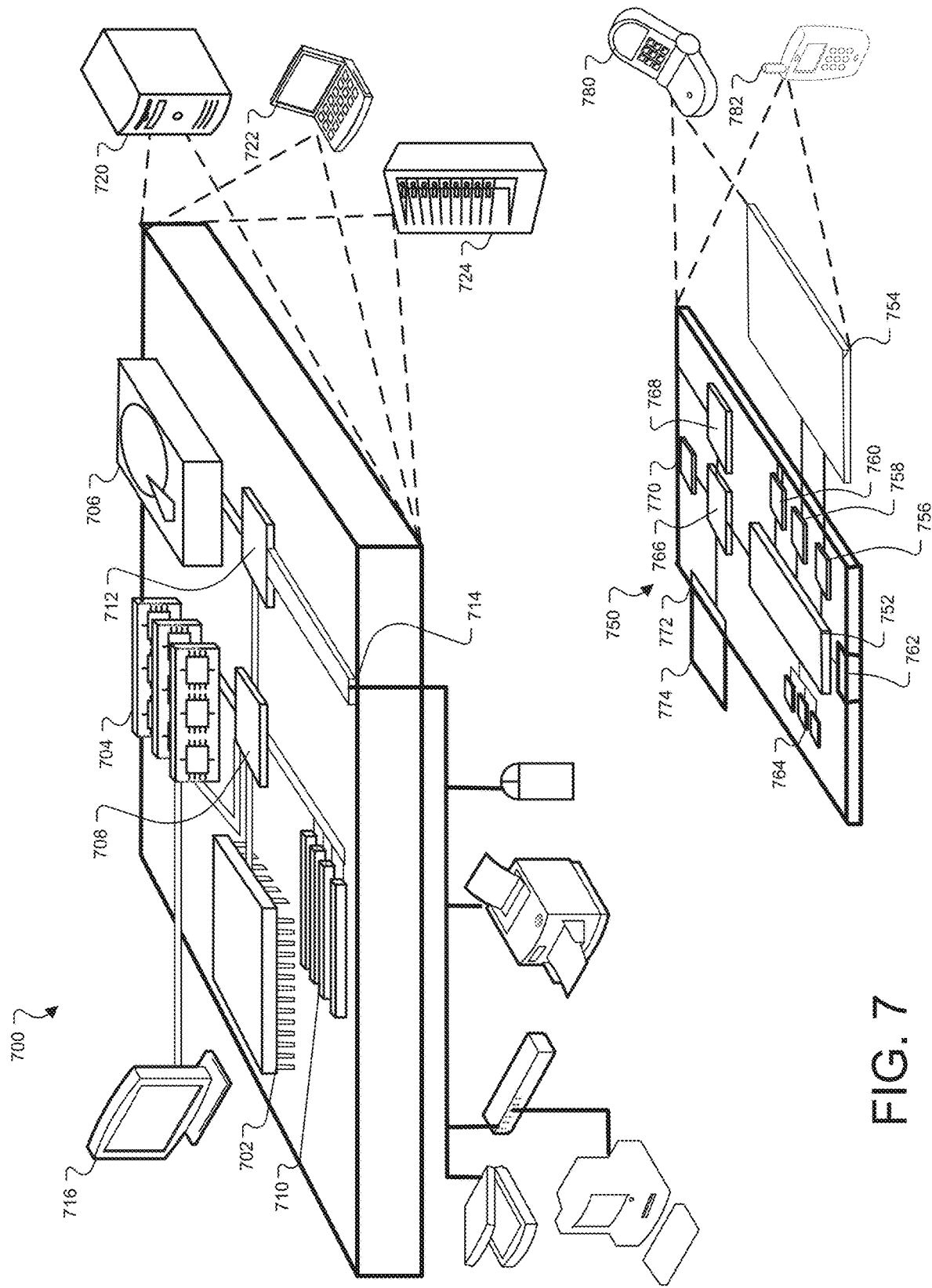
FIG. 7 is a block diagram of components of a system for digital content delivery acceleration.

FIG. 7 shows example computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. Additionally, computing device 700 or 750 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various buses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic, computer-readable hardware storage device or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing devices 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be in communication with processor 752, so as to enable near area communication of device 750 with other devices. External interface 762 may provide, for example, for wired communication, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In-Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for content delivery acceleration may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A digital content acceleration system comprising:
   a keyed database for storing keyed data representing user profiles; and
   one or more computers comprising:

a data retrieval engine that retrieves, in response to receiving keyed data representing a user profile of a user, one of i) search data indicative of a search history associated with the user profile, ii) web history data indicative of one or more web pages accessed by a terminal device associated with the user profile, or iii) both i) and ii);

a parsing engine that extracts one or more attributes from the search data and the web history data, the one or more attributes relating the search data and the web history data to geographic locations;

a terminal device network access engine that generates probability data for each of the geographic locations that are related to the search data and the web history data by the attributes, the probability data for each particular geographic location, among the geographic locations, specifying a likelihood that one or more terminal devices associated with the user profile will request digital content about attractions or businesses located at the particular geographic location;

a content selection engine that retrieves, from a digital content provider, digital content about the attractions or businesses at two or more of the particular geographic locations based on the two or more particular geographic locations having higher likelihoods relative to other likelihoods of other geographic locations among the geographic locations; and a digital content assembler engine that (i) pre-assembles the digital content about the attractions or businesses at the two or more particular geographic locations for sending to the terminal device while the terminal device is located at a separate geographic location that differs from the two or more particular geographic locations, such that the digital content is assembled for rendering in advance of the system receiving a request to provide the digital content for display on the terminal device for the digital content, and (ii) delivers, to the terminal device, the pre-assembled digital content about the attractions or businesses at the two or more particular geographic locations prior to the terminal device being at either of the two or more particular geographic locations.

2. The digital content acceleration system of claim 1, wherein the keyed data comprises a search history and/or a browsing history of a user of the terminal device.

3. The digital content acceleration system of claim 1, wherein the system is configured to send the pre-assembled digital content to the terminal device during a period when the terminal device is online, and in advance of a request for the digital content being sent from the terminal device, such that the digital content is available to the user of the terminal device when the user subsequently issues a request for the digital content during a period when the terminal device is offline.

4. The digital content acceleration system of claim 1, wherein generating the probability data comprises:
clustering, into one or more topic clusters, the one or more attributes, the one or more topic clusters each indicative of a topic of a predetermined list of topics;
transforming, using a trained model, the one or more topic clusters into location data indicative of one or more geographic locations associated with a user; and
generating, based on the transforming, a probability that the user will visit each geographic location of the one or more geographic locations.

5. The digital content acceleration system of claim 4, wherein the transforming comprises executing one more machine learning algorithms.

6. The digital content acceleration system of claim 1, wherein the parsing engine extracts demographic data associated with a user, and wherein the one or more attributes characterize the demographic data.

7. The digital content acceleration system of claim 1, wherein the search data and the web history data are each associated with timing data, and wherein the terminal device network access engine generates a distribution of probabilities for the geographic locations based on the timing data.

8. The digital content acceleration system of claim 1, wherein the data retrieval engine fetches geographic location history data indicative of one or more geographic locations visited by a user, and wherein the one or more attributes further characterize the geographic location history data.

9. The digital content acceleration system of claim 1, wherein the one or more attributes comprise one or more of keywords and key phrases.

10. The digital content acceleration system claim 1, wherein the parsing engine extracts the one or more attributes based on matrix factorization or low rank approximation.

11. The digital content acceleration system of claim 1, wherein the digital content retrieved comprises a branded pin for placement on a virtual geographic map, the branded pin representing the particular geographic location associated with the digital content.

12. The digital content acceleration system of claim 1, wherein the digital content comprises a content item for an entity located at the particular geographic location associated with the digital content.

13. A method comprising:
storing keyed data representing user profiles in a keyed database;
retrieving, by a data retrieval engine, in response to receiving of keyed data representing a user profile of a user, one of i) search data indicative of a search history associated with the user profile, ii) web history data indicative of one or more web pages accessed by a terminal device associated with the user profile, or iii) both i) and ii);
extracting, by a parsing engine, one or more attributes from the search data and the web history data, the one or more attributes relating the search data and the web history data to geographic locations;
generating, by a terminal device network access engine, probability data for each of the geographic locations that are related to the search data and the web history data by the attributes, the probability data for each particular geographic location, among the geographic locations, specifying a likelihood that one or more terminal devices associated with the user profile will request digital content about attractions or businesses located at the particular geographic location;
retrieving, by a content selection engine, from a digital content provider, digital content about the attractions or businesses at two or more of the particular geographic locations based on the two or more particular geographic locations having higher likelihoods relative to other likelihoods of other geographic locations among the geographic locations;
pre-assembling, by a digital content assembler engine, the digital content about the attractions or businesses at the two or more particular geographic locations for sending to the terminal device while the terminal device is located at a separate geographic location that differs from the two or more particular geographic locations, such that the digital content is assembled for rendering in advance of the system receiving a request to provide the digital content for display on the terminal device for the digital content and delivering, to the terminal device, the pre-assembled digital content about the attractions or businesses at the two or more particular geographic locations prior to the terminal device being at either of the two or more particular geographic locations.

14. The method of claim 13, wherein the keyed data comprises a search history and/or a browsing history of a user of the terminal device.

15. The method of claim 13, wherein the system is configured to send the pre-assembled digital content to the terminal device during a period when the terminal device is online, and in advance of a request for the digital content being sent from the terminal device, such that the digital content is available to the user of the terminal device when the user subsequently issues a request for the digital content during a period when the terminal device is offline.

16. The method of claim 13, wherein generating the probability data comprises:
    clustering, into one or more topic clusters, the one or more attributes, the one or more topic clusters each indicative of a topic of a predetermined list of topics;
    transforming, using a trained model, the one or more topic clusters into location data indicative of one or more geographic locations associated with a user; and
    generating, based on the transforming, a probability that the user will visit each geographic location of the one or more geographic locations.

17. The method of claim 16, wherein the transforming comprises executing one more machine learning algorithms.

18. The method of claim 13, wherein the parsing engine extracts demographic data associated with a user, and wherein the one or more attributes characterize the demographic data.

19. The method of claim 13, wherein the search data and the web history data are each associated with timing data, and wherein the terminal device network access engine generates a distribution of probabilities for the geographic locations based on the timing data.

20. The method of claim 13, wherein the data retrieval engine fetches geographic location history data indicative of one or more geographic locations visited by a user, and wherein the one or more attributes further characterize the geographic location history data.

21. The method of claim 13, wherein the one or more attributes comprise one or more of keywords and key phrases.

22. The method of claim 13, wherein the parsing engine extracts the one or more attributes based on matrix factorization or low rank approximation.

23. The method of claim 13, wherein the digital content retrieved comprises a branded pin for placement on a virtual geographic map, the branded pin representing the particular geographic location associated with the digital content.

24. The method of claim 13, wherein the digital content comprises a content item for an entity located at the particular geographic location associated with the digital content.

25. A non-transitory computer readable medium storing instructions that upon execution by a digital content acceleration system that includes one or more processors cause the digital content acceleration system to perform operations comprising:
    storing keyed data representing user profiles in a keyed database;
    retrieving in response to receiving of keyed data representing a user profile of a user, one of i) search data indicative of a search history associated with the user profile, ii) web history data indicative of one or more web pages accessed by a terminal device associated with the user profile, or iii) both i) and ii);
    extracting one or more attributes from the search data and the web history data, the one or more attributes relating the search data and the web history data to geographic locations;
    generating probability data for each of the geographic locations that are related to the search data and the web history data by the attributes, the probability data being indicative of for each particular geographic location, among the geographic locations, specifying a likelihood that one or more terminal devices associated with the user profile will request digital content about attractions or businesses located at the particular geographic location;
    retrieving from a digital content provider, digital content about the attractions or businesses at two or more of the particular geographic locations based on the two or more particular geographic locations having higher likelihoods relative to other likelihoods of other geographic locations among the geographic locations;
    pre-assembling the digital content about the attractions or businesses at the two or more particular geographic locations for sending to the terminal device while the terminal device is located at a separate geographic location that differs from the two or more particular geographic locations, such that the digital content is assembled for rendering in advance of the system receiving a request to provide the digital content for display on the terminal device for the digital content; and
    delivering, to the terminal device of the user, the pre-assembled digital content about the attractions or businesses at the two or more particular geographic locations prior to the terminal device being at either of the two or more particular geographic locations.

26. The non-transitory computer readable medium of claim 25, wherein the keyed data comprises a search history and/or a browsing history of a user of the terminal device.

27. The non-transitory computer readable medium of claim 25, wherein the instructions cause the content acceleration system to send the pre-assembled digital content to the terminal device during a period when the terminal device is online, and in advance of a request for the digital content being sent from the terminal device, such that the digital content is available to the user of the terminal device when the user subsequently issues a request for the digital content during a period when the terminal device is offline.

28. The non-transitory computer readable medium of claim 25, wherein generating the probability data comprises:
    clustering, into one or more topic clusters, the one or more attributes, the one or more topic clusters each indicative of a topic of a predetermined list of topics;
    transforming, using a trained model, the one or more topic clusters into location data indicative of one or more geographic locations associated with a user; and generating, based on the transforming, a probability that the user will visit each geographic location of the one or more geographic locations.

29. The non-transitory computer readable medium of claim 28, wherein the transforming comprises executing one more machine learning algorithms.

30. The non-transitory computer readable medium of claim 25, wherein the instructions cause the digital content acceleration system to perform operations comprising extracting demographic data associated with a user, and wherein the one or more attributes characterize the demographic data.

31. The non-transitory computer readable medium claim 25, wherein the search data and the web history data are each associated with timing data, and wherein the terminal device network access engine generates a distribution of probabilities for the geographic locations based on the timing data.

32. The non-transitory computer readable medium claim 25, wherein instructions cause the digital content acceleration system to perform operations comprising fetching geographic location history data indicative of one or more geographic locations visited by a user, and wherein the one or more attributes further characterize the geographic location history data.

33. The non-transitory computer readable medium claim 25, wherein the one or more attributes comprise one or more of keywords and key phrases.

34. The non-transitory computer readable medium claim 25, wherein the instructions cause the digital content acceleration system to perform operations comprising extracting the one or more attributes based on matrix factorization or low rank approximation.

35. The non-transitory computer readable medium claim 25, wherein the digital content retrieved comprises a branded pin for placement on a virtual geographic map, the branded pin representing the particular geographic location associated with the digital content.

* * * * *

UNITED STATES PATENT AND TRADEMARK OFFICE
CERTIFICATE OF CORRECTION

PATENT NO. : 10,650,071 B2
APPLICATION NO. : 15/378135
DATED : May 12, 2020
INVENTOR(S) : Asgekar et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 578 days.

Signed and Sealed this
Thirty-first Day of January, 2023

Katherine Kelly Vidal
*Director of the United States Patent and Trademark Office*